(12) United States Patent
Aithal et al.

(10) Patent No.: US 11,573,741 B2
(45) Date of Patent: Feb. 7, 2023

(54) WRITE INPUT/OUTPUT OPTIMIZATION FOR VIRTUAL DISKS IN A VIRTUALIZED COMPUTING SYSTEM

(71) Applicant: VMWARE, INC., Palo Alto, CA (US)

(72) Inventors: Prasanna Aithal, Bangalore (IN); Rohan Pasalkar, Palo Alto, CA (US); Prasad Rao Jangam, Palo Alto, CA (US); Srinivasa Shantharam, Bangalore (IN); Mahesh Hiregoudar, Bangalore (IN); Srikanth Mahabalarao, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/398,021

(22) Filed: Aug. 10, 2021

(65) Prior Publication Data
US 2022/0365722 A1 Nov. 17, 2022

(30) Foreign Application Priority Data
May 11, 2021 (IN) .............................. 202141021295

(51) Int. Cl.
*G06F 3/06* (2006.01)
*G06F 9/455* (2018.01)
*G06F 16/188* (2019.01)

(52) U.S. Cl.
CPC ............ *G06F 3/0659* (2013.01); *G06F 3/061* (2013.01); *G06F 3/0631* (2013.01);
(Continued)

(58) Field of Classification Search
CPC ...... G06F 3/0659; G06F 3/061; G06F 3/0631; G06F 3/0664; G06F 3/0673; G06F 9/45558; G06F 2009/45583; G06F 16/188
See application file for complete search history.

(56) References Cited

U.S. PATENT DOCUMENTS

| 5,440,716 A * | 8/1995 | Schultz ................. G06F 3/0632 |
| | | 711/170 |
| 9,916,244 B1 * | 3/2018 | Tolvanen ................ G06F 3/065 |

(Continued)

OTHER PUBLICATIONS

Prabhakaran, V. et al. "Analysis and Evolution of Journaling File Systems," 2005 USENIX Annual Technical Conference, pp. 105-120.

*Primary Examiner* — Edward J Dudek, Jr.
(74) *Attorney, Agent, or Firm* — Kim & Stewart LLP

(57) ABSTRACT

An example method of handling, at a hypervisor on a host in a virtualized computing system, a write input/output (IO) operation to a file on a storage device having a virtual machine file system (VMFS) is described. The method includes: sorting, at the hypervisor, a scatter-gather array for the write IO operation into sets of scatter-gather elements, each of the sets including at least one scatter-gather element targeting a common file block address; resolving offsets of the sets of scatter-gather elements to identify a first scatter-gather array of transaction-dependent scatter-gather elements; generating logical transactions for the first scatter-gather array having updates to metadata of the VMFS for the file; batching the logical transactions into a physical transaction; and executing the physical transaction to commit the updates to the metadata of the VMFS on the storage device for the file.

20 Claims, 8 Drawing Sheets

(52) U.S. Cl.
CPC .......... *G06F 3/0664* (2013.01); *G06F 3/0673* (2013.01); *G06F 9/45558* (2013.01); *G06F 16/188* (2019.01); *G06F 2009/45583* (2013.01)

(56) References Cited

U.S. PATENT DOCUMENTS

2010/0083247 A1* 4/2010 Kanevsky ........... G06F 9/45558
                                                                 718/1
2019/0018805 A1* 1/2019 Benisty ................. G06F 3/0679

* cited by examiner

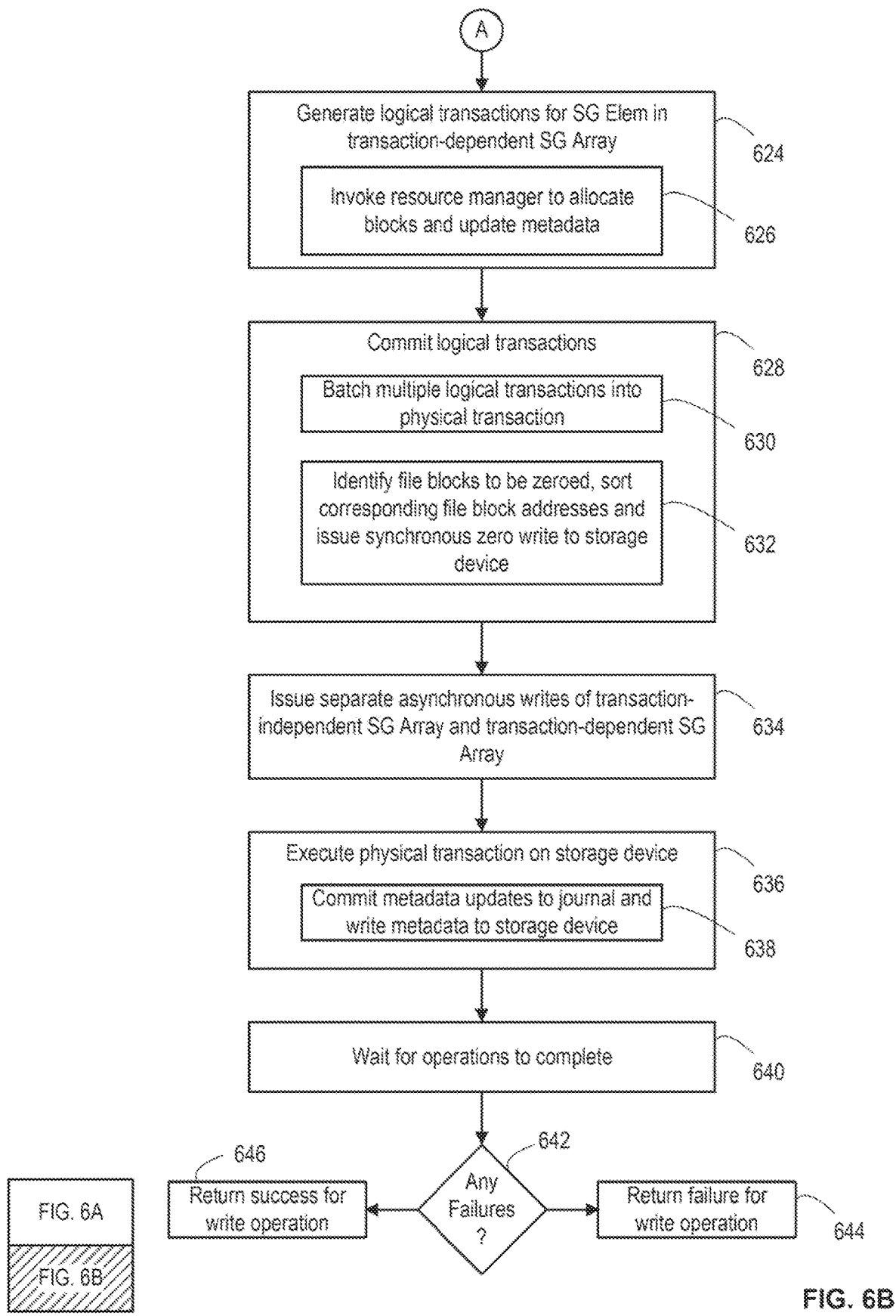

WRITE INPUT/OUTPUT OPTIMIZATION FOR VIRTUAL DISKS IN A VIRTUALIZED COMPUTING SYSTEM

RELATED APPLICATIONS

Benefit is claimed under 35 U.S.C. 119(a)-(d) to Foreign Application Serial No. 202141021295 filed in India entitled "WRITE INPUT/OUTPUT OPTIMIZATION FOR VIRTUAL DISKS IN A VIRTUALIZED COMPUTING SYSTEM", on May 11, 2021, by VMware, Inc., which is herein incorporated in its entirety by reference for all purposes.

Applications today are deployed onto a combination of virtual machines (VMs), containers, application services, and more within a software-defined datacenter (SDDC). The SDDC includes a server virtualization layer having clusters of physical servers that are virtualized and managed by virtualization management servers. Each host includes a virtualization layer (e.g., a hypervisor) that provides a software abstraction of a physical server (e.g., central processing unit (CPU), random access memory (RAM), storage, network interface card (NIC), etc.) to the VMs. A virtual infrastructure administrator ("VI admin") interacts with a virtualization management server to create server clusters ("host clusters"), add/remove servers ("hosts") from host clusters, deploy/move/remove VMs on the hosts, deploy/configure networking and storage virtualized infrastructure, and the like. The virtualization management server sits on top of the server virtualization layer of the SDDC and treats host clusters as pools of compute capacity for use by applications.

VMs store data on virtual disks, which are files stored on physical storage devices. For example, block storage devices can be formatted with the Virtual Machine File System (VMFS). VMFS is a journaling file system that efficiently stores files for use as virtual disks for VMs. The VMFS journal only logs metadata changes and not changes to the data. A write input/output (IO) operation to a file on VMFS requires a transaction to update VMFS metadata, which in turn involves multiple subsystems within a storage stack of the hypervisor. With the involvement of these subsystems, such a write IO operation can face a severe performance penalty, resulting in overall performance degradation. Thus, it is desirable to optimize such write IO operations.

BRIEF DESCRIPTION OF THE DRAWINGS

FIGS. 6A-6B show a flow diagram depicting a method of handling a write IO operation at a hypervisor according to an embodiment.

DETAILED DESCRIPTION

Figure 1:
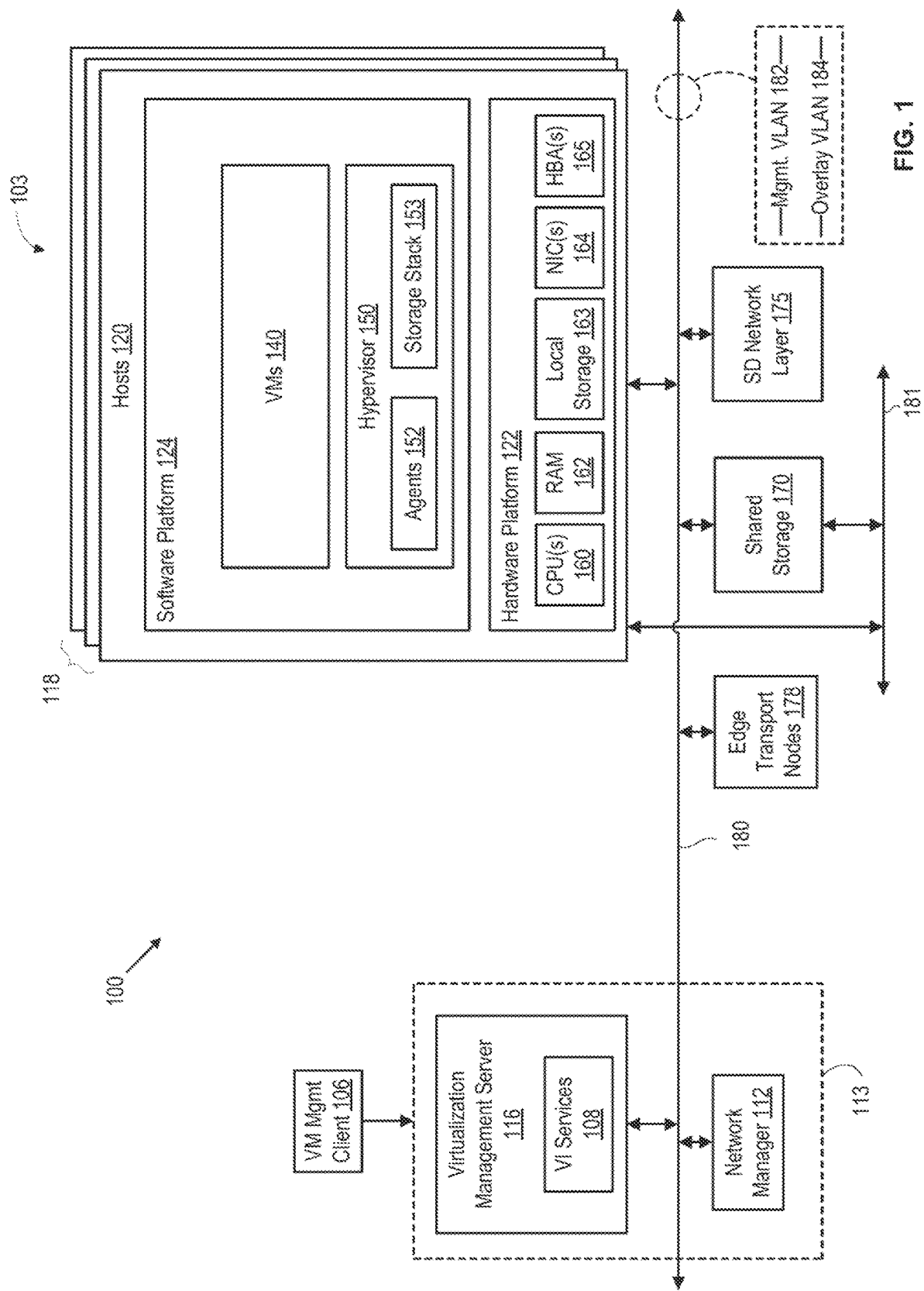
FIG. 1 is a block diagram of a virtualized computing system in which embodiments described herein may be implemented.

FIG. 1 is a block diagram of a virtualized computing system 100 in which embodiments described herein may be implemented. System 100 includes a cluster of hosts 120 ("host cluster 118") that may be constructed on server-grade hardware platforms such as an x86 architecture platforms. For purposes of clarity, only one host cluster 118 is shown. However, virtualized computing system 100 can include many of such host clusters 118. As shown, a hardware platform 122 of each host 120 includes conventional components of a computing device, such as one or more central processing units (CPUs) 160, system memory (e.g., random access memory (RAM) 162), one or more network interface controllers (NICs) 164, one or more host bust adaptors (HBAs) 165, and optionally local storage 163. CPUs 160 are configured to execute instructions, for example, executable instructions that perform one or more operations described herein, which may be stored in RAM 162. NICs 164 enable host 120 to communicate with other devices through a physical network 180. Physical network 180 enables communication between hosts 120 and between other components and hosts 120 (other components discussed further herein). Physical network 180 can include a plurality of VLANs to provide external network virtualization as described further herein.

in the embodiment illustrated in FIG. 1, hosts 120 can access shared storage 170 by using NICs 164 to connect to network 180. In addition or alternatively, hosts 120 can access shared storage 170 using HBAs 165 connected to a separate network 181 (e.g., a fibre channel (FC) network). Shared storage 170 include one or more storage arrays, such as a storage area network (SAN), network attached storage (NAS), or the like. Shared storage 170 may comprise magnetic disks, solid-state disks (SSDs), flash memory, and the like as well as combinations thereof. In some embodiments, hosts 120 include local storage 163 (e.g., hard disk drives, solid-state drives, etc.). Local storage 163 in each host 120 can he aggregated and provisioned as part of a virtual SAN (vSAN), which is another form of shared storage 170. Hypervisor 150 includes a storage stack 153 comprising layers of software and drivers for accessing data on shared storage, as described further below.

A software platform 124 of each host 120 provides a virtualization layer, referred to herein as a hypervisor 150, which directly executes on hardware platform 122. In an embodiment, there is no intervening software, such as a host operating system (OS), between hypervisor 150 and hardware platform 122. Thus, hypervisor 150 is a Type-1 hypervisor (also known as a "bare-metal" hypervisor). As a result, the virtualization layer in host cluster 118 (collectively hypervisors 150) is a bare-metal virtualization layer executing directly on host hardware platforms. Hypervisor 150 abstracts processor, memory, storage, and network resources of hardware platform 122 to provide a virtual machine execution space within which multiple virtual machines (VM) 140 may be concurrently instantiated and executed. One example of hypervisor 150 that may be configured and used in embodiments described herein is a VMware ESXi™ hypervisor provided as part of the VMware vSphere® solution made commercially available by VMware, Inc. of Palo Alto, Calif. An embodiment of software platform 124 is discussed further below with respect to FIG. 2.

In embodiments, host cluster 118 is configured with a software-defined (SD) network layer 175. SD network layer 175 includes logical network services executing on virtualized infrastructure in host cluster 118. The virtualized infrastructure that supports the logical network services includes hypervisor-based components, such as resource pools, distributed switches, distributed switch port groups and uplinks, etc., as well as VM-based components, such as router control VMs, load balancer VMs, edge service VMs, etc. Logical network services include logical switches, logical routers, logical firewalls, logical virtual private networks (VPNs), logical load balancers, and the like, implemented on top of the virtualized infrastructure. In embodiments, virtualized computing system 100 includes edge transport nodes 178 that provide an interface of host cluster 118 to an external network (e.g., a corporate network, the public Internet, etc.). Edge transport nodes 178 can include a gateway between the internal logical networking of host cluster 118 and the external network. Edge transport nodes 178 can be physical servers or VMs.

Virtualization management server 116 is a physical or virtual server that manages host cluster 118 and the virtualization layer therein. Virtualization management server 116 installs agent(s) 152 in hypervisor 150 to add a host 120 as a managed entity. Virtualization management server 116 logically groups hosts 120 into host cluster 118 to provide cluster-level functions to hosts 120, such as VM migration between hosts 120 (e.g., for load balancing), distributed power management, dynamic VM placement according to affinity and anti-affinity rules, and high-availability. The number of hosts 120 in host cluster 118 may be one or many. Virtualization management server 116 can manage more than one host cluster 118.

In an embodiment, virtualized computing system 100 further includes a network manager 112. Network manager 112 is a physical or virtual server that orchestrates SD network layer 175. In an embodiment, network manager 112 comprises one or more virtual servers deployed as VMs. Network manager 112 installs additional agents 152 in hypervisor 150 to add a host 120 as a managed entity, referred to as a transport node. In this manner, host cluster 118 can be a cluster 103 of transport nodes. One example of an SD networking platform that can be configured and used in embodiments described herein as network manager 112 and SD network layer 175 is a VMware NSX® platform made commercially available by VMware, Inc. of Palo Alto, Calif. If network manager 112 is absent, virtualization management server 116 can orchestrate SD network layer 175.

Network manager 112 can deploy one or more transport, zones in virtualized computing system 100, including VLAN transport zone(s) and an overlay transport zone. A WAN transport zone spans a set of hosts 120 (e.g., host cluster 118) and is backed by external network virtualization of physical network 180 (e.g., a VLAN). One example VLAN transport zone uses a management VLAN 182 on physical network 180 that enables a management network connecting hosts 120 and the VI control plane (e.g., virtualization management server 116 and network manager 112). An overlay transport zone using overlay VLAN 184 on physical network 180 enables an overlay network that spans a set of hosts 120 (e.g., host cluster 118) and provides internal network virtualization using software components (e.g., the virtualization layer and services executing in VMs). Host-to-host traffic for the overlay transport zone is carried by physical network 180 on the overlay VLAN 184 using layer-2-over-layer-3 tunnels. Network manager 112 can configure SD network layer 175 to provide a cluster network 186 using the overlay network. The overlay transport zone can be extended into at least one of edge transport nodes 178 to provide ingress/egress between cluster network 186 and an external network.

Virtualization management server 116 and network manager 112 comprise a virtual infrastructure (VI) control plane 113 of virtualized computing system 100. In embodiments, network manager 112 is omitted and virtualization management server 116 handles virtual networking. Virtualization management server 116 can include VI services 108. VI services 108 include various virtualization management services, such as a distributed resource scheduler (DRS), high-availability (HA) service, single sign-on (SSO) service, virtualization management daemon, vSAN service, and the like. DRS is configured to aggregate the resources of host cluster 118 to provide resource pools and enforce resource allocation policies. DRS also provides resource management in the form of load balancing, power management, VM placement, and the like. HA service is configured to pool VMs and hosts into a monitored cluster and, in the event of a failure, restart VMs on alternate hosts in the cluster. A single host is elected as a master, which communicates with the HA service and monitors the state of protected VMs on subordinate hosts. The HA service uses admission control to ensure enough resources are reserved in the cluster for VM recovery when a host fails, SSO service comprises security token service, administration server, directory service, identity management service, and the like configured to implement an SSO platform for authenticating users. The virtualization management daemon is configured to manage objects, such as data centers, clusters, hosts, VMs, resource pools, datastores, and the like.

A VI admin can interact with virtualization management server 116 through a VM management client 106. Through VM management client 106, a VI admin commands virtualization management server 116 to form host cluster 118, configure resource pools, resource allocation policies, and other cluster-level functions, configure storage and networking, and the like.

Figure 2:
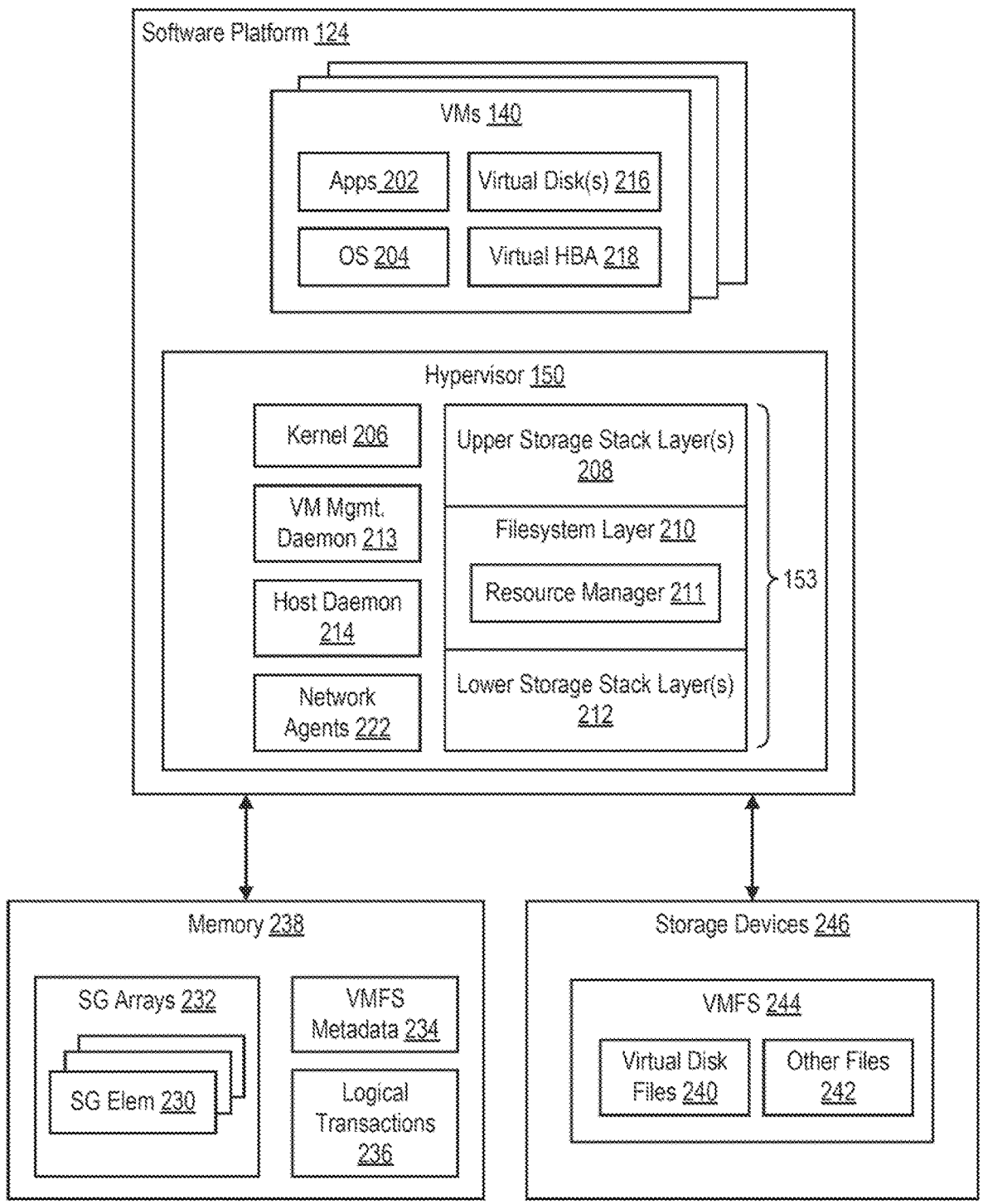
FIG. 2 is a block diagram depicting a logical relation of a software platform with respect to memory and storage devices according an embodiment.

FIG. 2 is a block diagram depicting a logical relation of software platform 124 with respect to memory and storage devices according to an embodiment. As described above, software platform 124 of host 120 includes hypervisor 150 that supports execution of VMs 140. In an embodiment, hypervisor 150 includes a kernel 206, VM management daemon 213, a host daemon 214, network agents 222, and storage stack 153. Kernel 206 performs various operating system and hypervisor functions including schedule the various processes of hypervisor 150. VM management daemon 213 is an agent 152 installed by virtualization management server 116. VM management daemon 213 provides an interface to host daemon 214 for virtualization management server 116. Host daemon 214 is configured to create, configure, and remove VMs 140. Network agents 222 comprise agents 152 installed by network manager 112. Network agents 222 are configured to cooperate with network manager 112 to implement logical network services. Network agents 222 configure the respective host as a transport node in a cluster 103 of transport nodes. Each VM 140 has applications (apps 202) running therein on top of an OS 204 (also referred to as a guest OS). VMs 140 include virtual HBAs 218 configured to access virtual disks 216.

Storage stack 153 includes upper storage layer(s) 208, filesystem layer 210, and lower storage layer(s) 212. Upper storage layer(s) 208 can include, for example, a small computer system interface (SCSI) virtualization layer configured to receive SCSI operations from VMs 140 through virtual HBAs 218. Upper storage layer(s) 208 can convert SCSI operations into filesystem operations for input to filesystem layer 210, including write input/output (IO) operations. Filesystem layer 210 manages creation, use, and deletion of files stored on storage devices 246. Each storage device 246 is formatted with a Virtual Machine File System (VMFS) 244. Each storage device 246 can be an individual device (e.g., a hard disk drive) or a system of devices (e.g., a SAN, hard disk array, or the like). VMFS 244 stores virtual disk files 240 that back virtual disks 216, as well as other support files ("other files 242"). Filesystem layer 210 converts filesystem operations into volume block operations for input to lower storage stack layer(s) 212. Filesystem layer 210 can include a resource manager 211 configured to use VMFS transactions to allocate file blocks and pointer blocks, as discussed below. Lower storage stack layer(s) 212 can include a logical volume manager configured to convert volume block operations into raw SCSI operations and a device access layer configured to apply command queuing and scheduling policies to the raw SCSI operations. Lower storage stack layer(s) 212 can further include a device driver configured to interface with NIC(s) 164 and/or HBA(s) 165 to send the raw SCSI operations to storage devices 246. Storage devices 246 can be part of shared storage 170. In other embodiments, storage devices 246 can be part of local storage 163 and lower storage stack layer(s) 212 can include a device driver for directly interfacing with storage devices 246.

Various data structures used by filesystem layer 210 can be stored in memory 238, which is part of RAM 162. Memory 238 stores scatter-gather (SG) arrays 232, VMFS metadata 234 and logical transactions 236. Each SG array includes a plurality of SG elements 230. A write IO operation received by filesystem layer 210 includes an SG array 232 as input to perform vectored IO. Each SG element 230 in SG array 232 stores an offset at which to write the data, a length of the data to be written, and an address of a memory buffer having the data to be written (i.e., an address within RAM 162). For each write IO operation targeting a file on VMFS 244, filesystem layer 210 can read in VMFS metadata 234 from VMFS 244 associated with the targeted file. In embodiments described below, filesystem layer 210 is configured to use logical transactions 236 when updating VMFS metadata on VMFS 244 during write IO operations. Filesystem layer 210 can generate multiple logical transactions 236, which are then hatched into a single physical transaction issued to a storage device 246. Logical transactions 236 are discussed further below.

Figure 3:
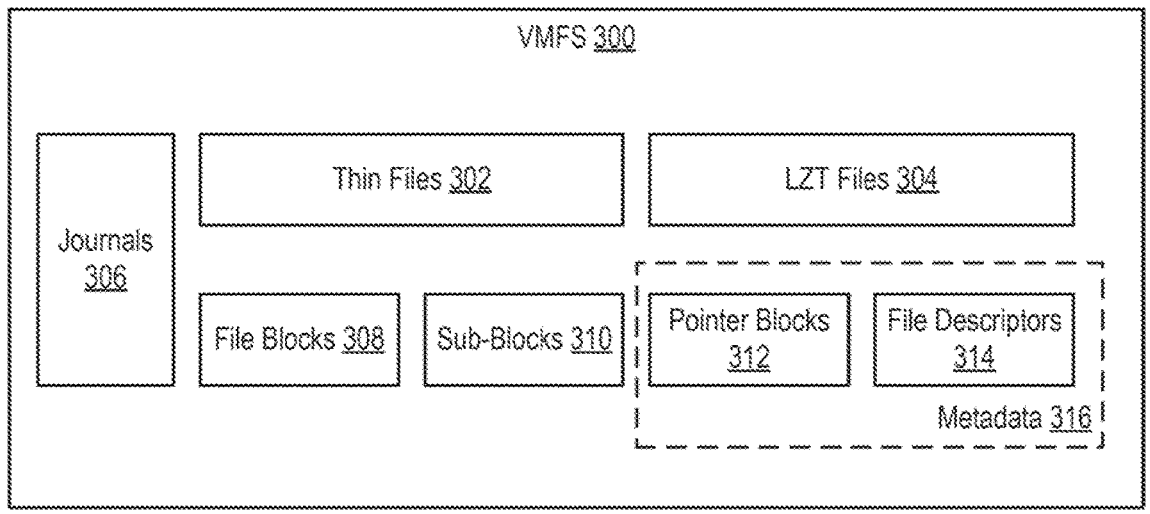
FIG. 3 is a block diagram depicting a VMFS according to an embodiment.

FIG. 3 is a block diagram depicting a VMFS 300 according to an embodiment. VMFS 300 manages block-based resources, which can include file blocks 308, sub-blocks 310, pointer blocks 312, and file descriptor blocks ("file descriptors 314"). Each file stored in VMFS 300 includes a file descriptor 314 stores various metadata for a file, which can include the size of the file and one or more addresses within storage device 246. File descriptor 314 can also store information such as file ownership, access mode (read, write, execute permissions for various users), file mode (discussed further below), and the like. File blocks 308 have a fixed size (e.g., 1 MB) and store the data of a file. In one file mode, the addresses in file descriptor 314 can point to file blocks 308. Sub-blocks 310 are similar to file blocks 308 and store data of a file. However, sub-blocks can be a smaller size that file blocks 308 (e.g., 64 KB versus 1 MB). In one file mode, the addresses in file descriptor 314 point to sub-blocks 310. Pointer blocks 312 store addresses and related metadata for file blocks 308. In some file modes, the addresses in file descriptor 314 point to pointer blocks 312. Pointer blocks 312 and file descriptors 314 comprises VMFS metadata 316 stored on storage device 246.

In embodiments, files stored on VMFS 300 include thin files 302 and lazy-zeroed thick (LZT) files 304. A thin file 302 is a file that is only allocated blocks upon first write. For example, creating a 20 GB thin file would result in zero file blocks 308 being allocated to the file. Later, when data is written to the file, file block(s) 308 are allocated for that region of the file being written to. In embodiments, some virtual disk files 240 can be thin files 302. An LZT file 304 is a file that is fully allocated when it is created, but none of its blocks are zeroed out at the time of creation, For example, creating a 20 GB LZT file would result in 20 GB of file blocks 308 being allocated to the file, but not filled with zeros.

VMFS 300 includes journals 306. In embodiments, each host 120 accessing VMFS 300 includes its own journal 306. As noted above, VMFS 300 is a journaling file system that logs metadata updates through VMFS transactions. VMFS 300 can include other objects not shown for purposes of clarity, such as various locks used by hosts 120 to obtain exclusive access to subsets of the resources.

Figure 4:
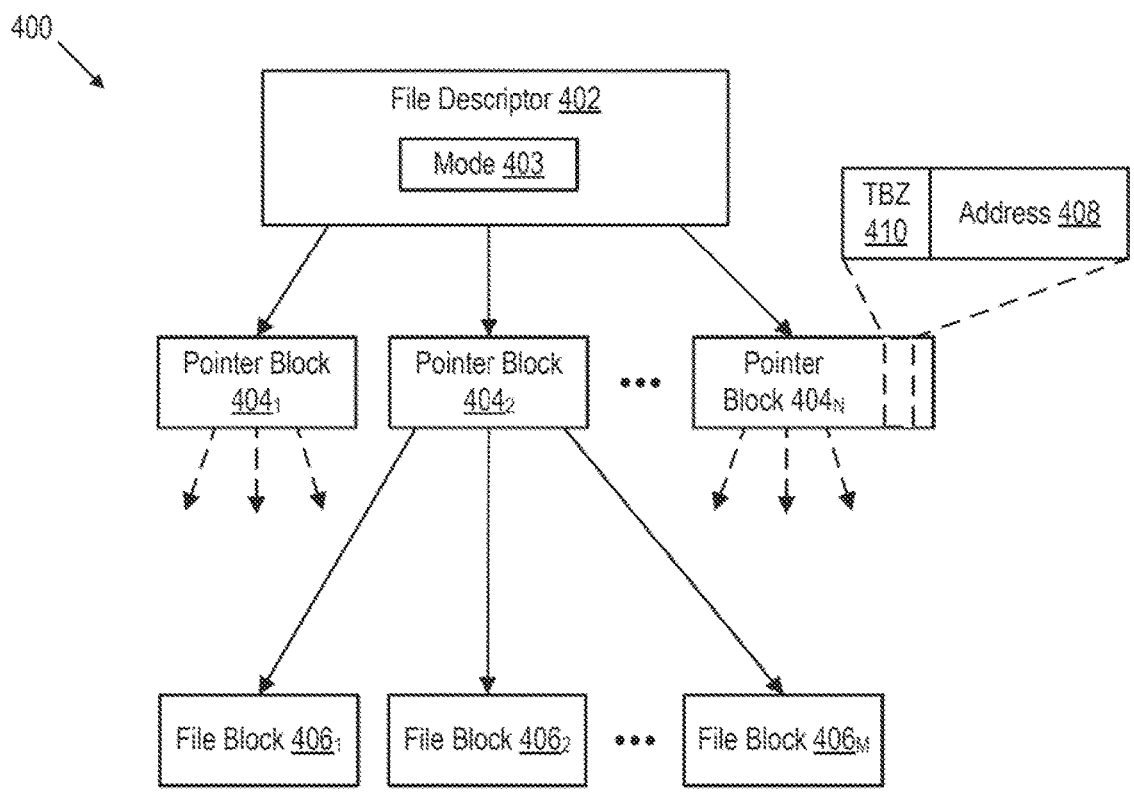
FIG. 4 is a block diagram depicting a file stored on a VMFS according to an embodiment.

FIG. 4 is a block diagram depicting a file 400 stored on a VMFS according to an embodiment. File 400 comprises a file descriptor 402, one or more pointer blocks 404 (e.g., pointer blocks $404_1 \ldots 404_N$, where N is an integer greater than zero), and one or more file data blocks 406 (e.g., file blocks $406_1 \ldots 406_M$, where M is an integer greater than zero). File descriptor 402 is a block of storage device 246 or a data object located within a block of storage device 246. A pointer block 404 is a block of storage system 104 or a data object located within a block of storage system 104. File descriptor 402 is a root of file 400. File descriptor 402 stores metadata of file 400 as discussed above. The metadata in file descriptor 402 includes a mode 403 for file 400. In an embodiment, mode 403 can be set to small data, direct address, single indirect address, and double indirect address. The value of the mode is based on the length of the file and the file block size. In the direct address mode, addresses in file descriptor 402 directly point to file blocks 406 (i.e., pointer blocks 404 are omitted). In the single indirect address mode, addresses in file descriptor 402 point to pointer blocks 404 (known as indirect pointer blocks), and addresses in pointer blocks 404 point to file blocks 406. In the double indirect address mode, addresses in file descriptor 402 point to a first level of pointer blocks (known as double-indirect pointer blocks), addresses in the first level pointer blocks point to a second level of pointer blocks (indirect pointer blocks), and addresses in the second level of pointer blocks point to the file blocks. Thus, there can be more than one level of pointer blocks 404. In the small data mode, addresses in file descriptor 404 point to sub-blocks 310 (not shown in the example of FIG. 4).

The addresses in file descriptor 402 and pointer blocks 404 may be logical or physical addresses. A logical address is the address at which data appears to reside from the perspective of a guest OS within VM 140. A logical address may be different from the physical address due to the operation of an address translator or mapping function. Such mapping function may be, for example, maintained in pointer blocks 404, where file offsets are mapped to a volume address of storage device 246. It should be noted that the volume address itself may not be a physical address but may be a logical address that is translated to a physical address of storage device 246 by components of shared storage 170.

A block within storage system 104 (e.g., block containing file descriptor 402, pointer block 404, or file block 406) may be, for example, 4 KB, 16 KB, 1 MB, or 32 MB in size. In an embodiment, file descriptor 402 is 4 KB, pointer block 404 is 64 KB, and file block 406 is 1 MB but can range from 1 MB to 16 MB in size.

File blocks 406 contain data of file 400, while file descriptor 402 and pointer blocks 404 contain metadata of file 400. As used herein, "data" of a file is the data that an application or guest OS may utilize directly. As used herein, "metadata" of a file is data that describes aspects of the data written, being written, or to be written to file blocks 406 of storage device 246. As used herein, "data" of file 400 includes information stored within file block(s) 406 of file 400 and does not typically include information stored within file descriptor 402 of file 400 and information stored within pointer block(s) 404 of file 400. As used herein, "metadata" of file 400 includes information that is stored or that will be stored within file descriptor 402 of file 400 and within pointer block(s) 404 of file 400. In an embodiment, "metadata" does not typically include information stored within file block(s) 406 of file 400.

Each pointer block 404 also includes metadata that indicates whether file blocks 406, to which that pointer block 404 points, have been zeroed and allocated. For example, each indirect pointer block can include a plurality of addresses 408, each of which includes metadata having at least a to-be-zeroed (TBZ) field 410. If TBZ field 410 is set, the file block pointed to by the address has not been zeroed. If TBZ field 410 is unset, the file block pointed to by the address has been zeroed. As used herein, to zero a storage block means to fill in zeroes in all data storage positions of the storage block. In an embodiment, the zeroing may be accomplished by sending the SCSI UNMAP command to storage device 246, indicating which file block 406 to unmap, by sending zeroed buffers, or by sending a SCSI UNMAP/TRIM command.

Figure 5:
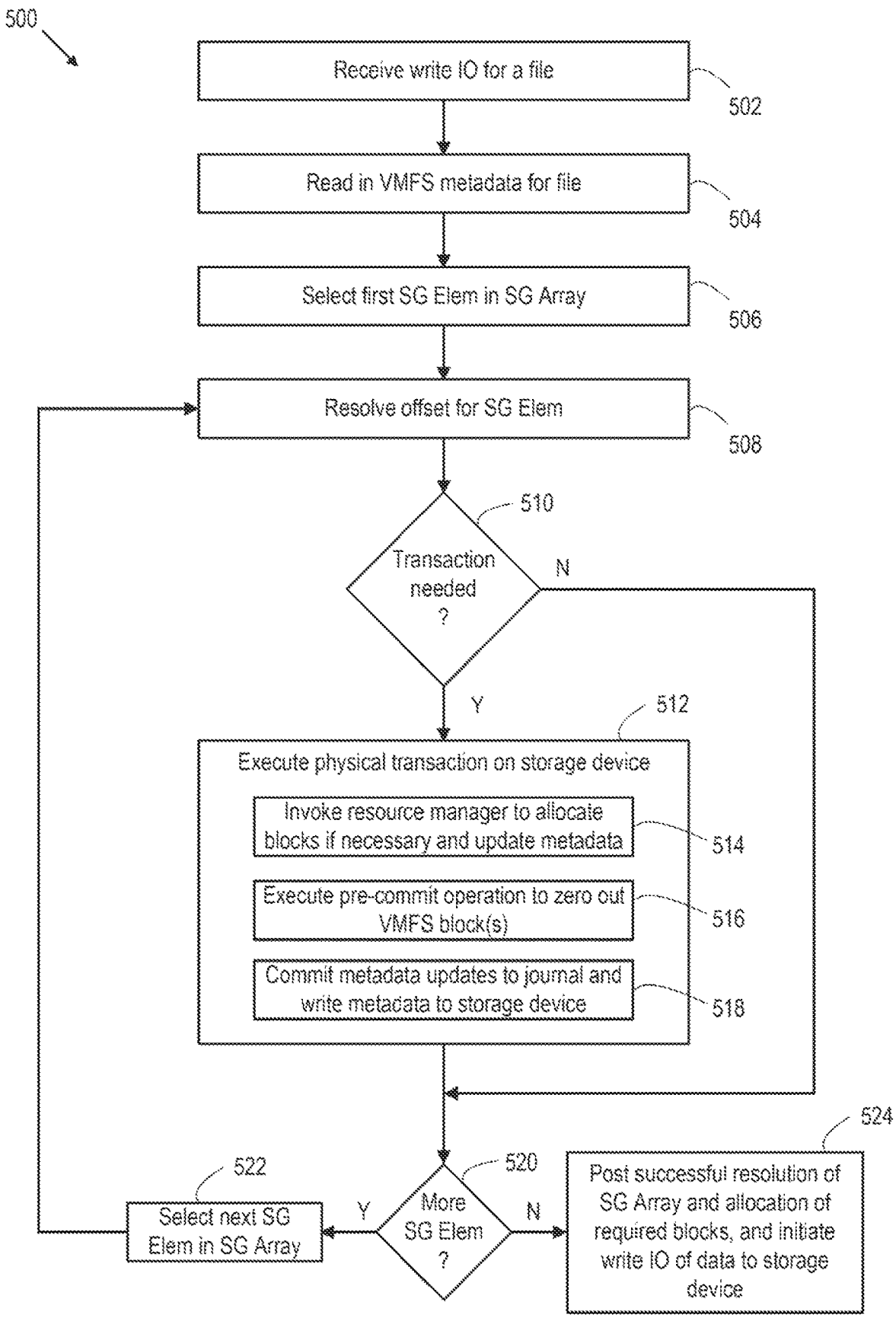
FIG. 5 is a flow diagram depicting a method of handling ay rite IO operation in a hypervisor.

FIG. 5 is a flow diagram depicting a method 500 of handling a write IO operation in a hypervisor. Method 500 is one way of handing write IO operations at a hypervisor. However, there are several inefficiencies in method 500, which will be discussed below. Techniques for improving upon method 500 are discussed further below with respect to FIG. 6.

Method 500 begins at step 502, where the hypervisor receives a write IO operation ("write IO") for a file from a VM. For example, a VM may be writing to a virtual disk attached thereto and the target file is thin file or LZT file on a VMFS-formatted storage device. The write IO operation includes an SG array created by the VM. At step 504, the hypervisor reads in VMFS metadata for the file from the storage device (e.g., file descriptor and pointer blocks). At step 506, the hypervisor selects the first SG elem in the SG array. For example, the hypervisor can process each SG elem in the SG array in order from the least index to the highest index. At step 508, the hypervisor resolves the write offset in the SG elem. mm At step 510, the hypervisor determines whether a VMFS transaction is needed for the SG elem. A write IO issued to a file requires a transaction for VMFS metadata updates in the following cases: 1) a write operation targets a portion of a file to which no file block is yet allocated; or 2) a write operation targets a portion of a file to which a file block has been allocated but has yet to be zeroed. For the second case, as part of a write to such a file block, the TBZ field associated with the file block address needs to be reset when the file block is zeroed on the storage device. If the write operation targets a portion of a file to which a file block has been allocated and zeroed, then no transaction is required, since there is no VMFS metadata that needs to be updated. If at step 510 no transaction is required, method 500 proceeds to step 520. Otherwise, method 500 proceeds first to step 512.

At step 512, the hypervisor executes a physical transaction on the storage device. The physical transaction can include: At step 514, the hypervisor can invoke the resource manager to allocate blocks (e.g., file block(s), pointer block(s)) if necessary and updates the VMFS metadata (in memory). At step 516, the hypervisor executes a pre-commit operation to zero out file block(s). For example, if a file block is being allocated, the hypervisor can issue a write to the storage device to zero out the newly allocated file block. If the file block had been allocated, but not yet zeroed, the hypervisor can issue a write to zero out the file block. At step 518, the hypervisor commits metadata updates to the journal and writes the metadata to the storage device. Metadata updates include updating the file descriptor/pointer block(s) with address(es) of newly allocated block(s) and/or resetting TBZ field(s). Method 500 then proceeds to strep 520.

At step 520, the hypervisor determines whether there are more SG elems to process in the SG array. If so, method 500 proceeds to step 522 to select the next SG elem in the SO array. Method 500 then returns to strep 508 and repeats. Otherwise, method 500 proceeds to step 524. At step 524, the hypervisor posts successful resolution of the SG array and allocation of the required blocks. The hypervisor initiates the write IO of the SG array to the storage device (e.g., writing the data to the file blocks).

There are several inefficiencies with method 500. First, the SG array can include multiple SG elems that have offsets that resolve to the same file block. For example, VMFS file block size can be set to 1 MB. The SG array issued for a write IO operation to a file can involve multiple SG elem, which may not be sorted based on the offset of the SG elem. This implies that for a given write to a file on VMFS, there could be more than one SG elem that targets the same file block of a file. It is inefficient to resolve multiple file offsets for multiple SG elem that belong to the same file block.

Second, with vectored IO, it is possible to have a few SG elem from an SG array that require VMFS transactions while the rest of the SG elem do not require VMFS transactions. Write IO for transaction-dependent and transaction-independent SG elem sets do not have dependency on each other and thus it is inefficient to handle those write operations serially.

Third, it is costly in terms of IO and CPU cycles to invoke the resource manager to allocate block(s). The resource manager allocation workflow involves multiple synchronization points and metadata IOs as it allocates resources. Method 500 invokes the resource manager for block allocation on a per SG elem basis, which results in performance degradation.

Fourth, if the write IO for an SG elem requires a new file block to be allocated, the requirement at the end of the write IO depending on the status of the write IO is as follows.

Requirement A: If the write IO operation succeeds:
Requirement A.1: The VMFS metadata updates required for new block allocation must be recorded using a VMFS transaction. In other words, file metadata pertaining to the write IO file offset must point to a newly allocated file block.

Requirement A.2: A newly allocated file block must contain the write IO data spanning the portion covered by a write IO SG array.

Requirement A.3: If the write IO was issued for the partial portion of a newly allocated file block, the remaining file block portion must contain all zeros.

Requirement B: If the write IO fails: Depending on the portion of the data that was written to the storage device for the write IO, the rest of the newly allocated file block that was not covered by the written data must return all zero bytes for any forthcoming read IO operation.

Requirement A.3 ensures that the read IO operation issued to the portion of a file that is not yet written returns all zero bytes, which is a security requirement. Considering Requirement B: For example, consider a write IO issued to cover 64 KB of the VMFS file block that is not yet allocated starting from an offset 0 of a VMFS file block. This means that the write IO is issued for the portion of a VMFS file block starting from offset 0 spanning a portion of size 64 KB. Consider the write IO to be successfull to allocate a new file block of 1 MB in size and the actual write IO for 64 KB data fails. In this scenario, the expectation at the end of the failed write IO is that the portion of the file covered by the newly allocated file block that is not targeted by the write IO must return all zero bytes for any forthcoming read IO to meet security requirements.

Method 500 achieves Requirements A and B as follows. For a write IO that requires a new file block to be allocated, the following sequence of metadata IO is invoked:

1) Finalize the new file block that is to be allocated to the file using a VMFS transaction. Issue a synchronous zero write IO for the entire file block to be allocated.
2) Commit the VMFS transaction that covers VMFS metadata updates for the new file block allocation that is zeroed out in 1) above. This involves issuing synchronous metadata write IOs to the VMFS journal.
3) Issue a synchronous IO for the actual write IO data to the newly allocated file block. The write IO sequence followed is A->B->C, where -> indicates a "happens before" relationship. Meaning if A->B, then write IO A is finished before issuing write IO B. An inefficiency with method 500 is that write IOs in operations A, B, and C are performed serially in order to meet Requirement A and Requirement B. Techniques described below achieve performance improvement without violating Requirement A and Requirement B discussed above.

Figure 6A:
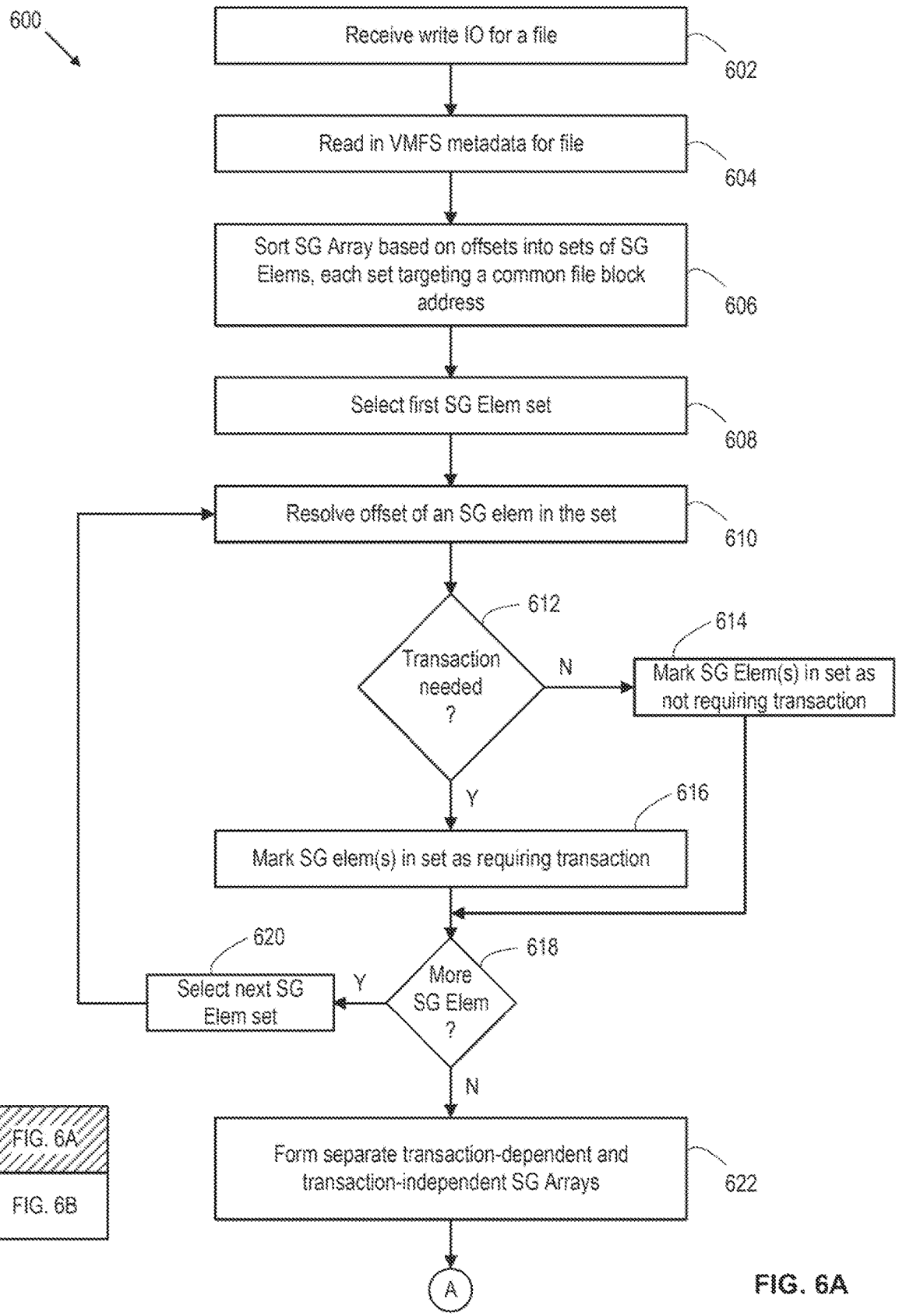

FIGS. 6A-6B show a flow diagram depicting a method 600 of handling a write IO operation at a hypervisor according to an embodiment. Method 600 improves upon method 500 discussed above. The improvements thereof are discussed following the description of method 600.

Method 600 begins at step 602, where filesystem layer 210 receives a write IO operation for a file from a VM 140. For example, a VM 140 may be writing to a virtual disk 216 attached thereto and the target file is a virtual disk file 240 (e.g., a thin file 302 or LZT file 304) on a VMFS-formatted storage device. The write IO operation includes an SG array 232 created by VM 140. At step 604, filesystem layer 210 reads in VMFS metadata 316 for the file from storage device 246 (e.g., file descriptor and pointer blocks) and stores it in memory 238 (VMFS metadata 234).

At step 606, filesystem layer 210 sorts the SG array based on offsets in the SG elems. Filesystem layer 210 also tracks which SG elems have offsets that resolve to the same file block address. Thus, filesystem layer 210 identifies sets of SG elems, each set including one or more SG elems targeting a common file block address.

Figure 7A:
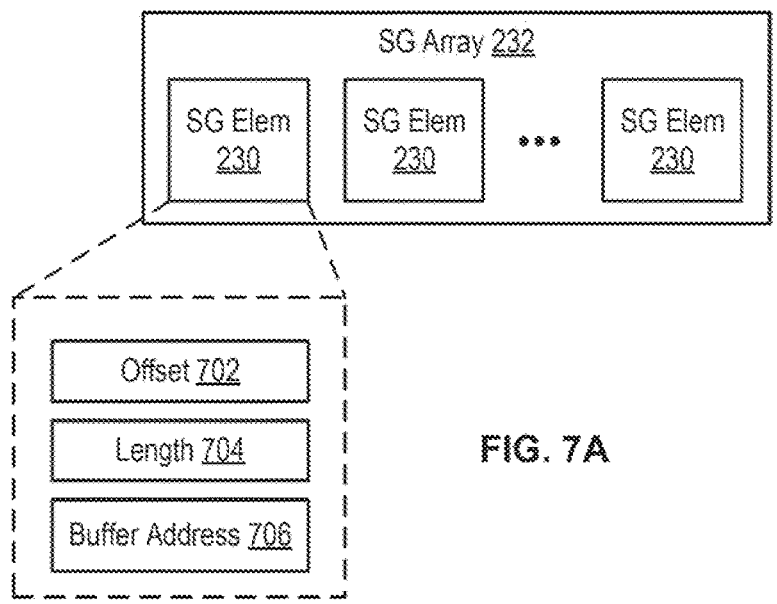
FIG. 7A is a block diagram depicting a scatter-gather array according to an embodiment.
Figure 7B:
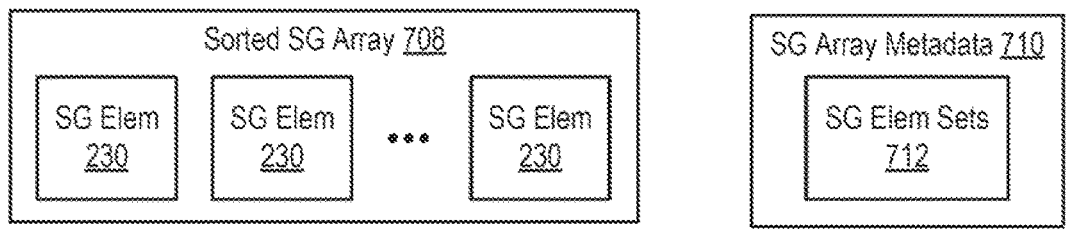
FIG. 7B is a block diagram depicting a sorted scatter-gather array and corresponding metadata according to an embodiment.

FIG. 7A is a block diagram depicting an SG array 232 according to an embodiment. SG array 232 includes a plurality of SG elems 230 as discussed above. Each SG elem 230 includes an offset 702 (also referred to as a write offset in the context of a write IO operation or a file offset), a length 704, and a buffer address 706. FIG. 7B is a block diagram depicting a sorted SG array 708 and corresponding SG array metadata 710 after step 606 of method 600. Sorted SC array 708 includes the plurality of SG elems 230 but sorted based on their offsets 702. SG array metadata 710 includes information that tracks which SG elems have offsets resolving to the same file block address in data. ("SG Elem sets 712").

Returning to FIG. 6A, at step 608, filesystem layer 210 selects the first SG elem set. At step 610, filesystem layer 210 resolves the offset of an SG elem in the SG elem set. A technique for resolving the offset in an SG elem is discussed below with respect to FIG. 8. In general, the process for resolving a write offset in an SG elem outputs the address of a file block mapped to the offset, if the file block is allocated or not, and if the file block is allocated, whether the file block is zeroed or not.

At step 612, filesystem layer 210 determines whether a VMFS transaction is required for the resolved offset. A write IO issued to a file requires a transaction for VMFS metadata updates in the following cases: 1) a write operation targets a portion of a file to which no file block is yet allocated; or 2) a write operation targets a portion of a file to which a file block has been allocated but has yet to be zeroed. For the second case, as part of a write to such a file block, the TBZ field associated with the file block address needs to be reset when the file block is zeroed on the storage device. If the write operation targets a portion of a file to which a file block has been allocated and zeroed, then no transaction is required, since there is no VMFS metadata that needs to be updated.

If a transaction is not required, method 600 proceeds to step 614, where filesystem layer 210 marks the SG elem(s) in the set as transaction-independent. Otherwise, method 600 proceeds to step 616, where filesystem layer 210 marks the SG elem(s) in the set as transaction-dependent. In either case, at step 618, filesystem layer 210 determines if there are more SG elems in the SG array to be processed. If so, method 600 proceeds to step 620 and selects the next SG elem set. Method then returns to step 610. If at step 618 there are no more SG elems to process, method 600 proceeds to step 622. At step 622, filesystem layer 210 forms separate transaction-dependent and transaction-independent SG arrays.

Figure 7C:
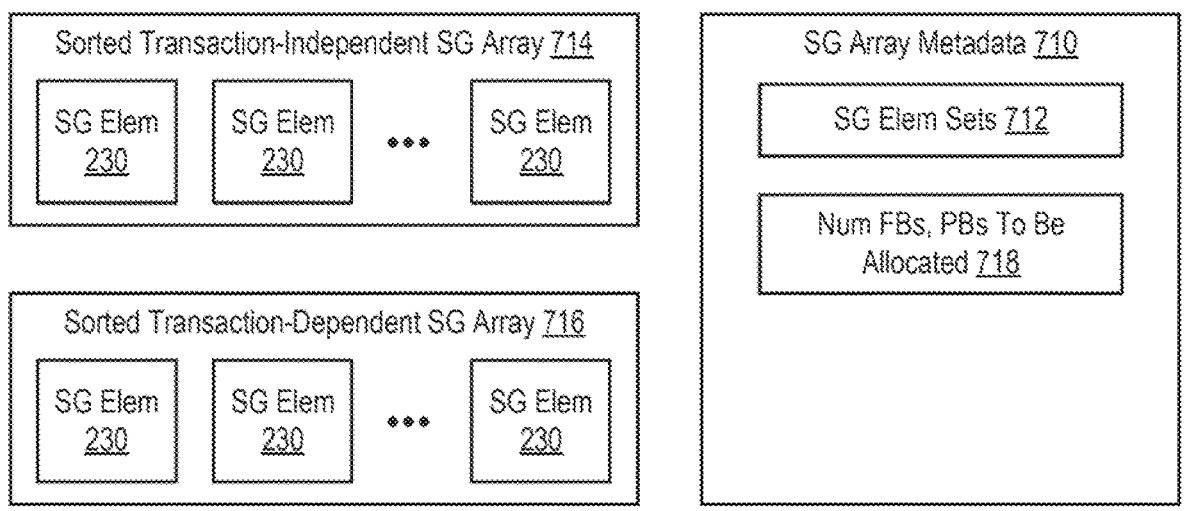
FIG. 7C is a block diagram depicting separate scatter-gather arrays based on transaction status according to an embodiment.

FIG. 7C is a block diagram depicting separate SG arrays based on transaction status according to an embodiment. After step 622, filesystem layer 210 forms sorted transaction-independent SG array 714 and sorted transaction-dependent SG array 716. Sorted transaction-independent SG array 714 includes those SG elems 230 that do not require a VMFS transaction. Sorted transaction-dependent SG array 716 includes those SG elems 230 that do require a VMFS transaction to update VMFS metadata on the storage device. SG array metadata 710 includes information that tracks the number of file blocks and pointer blocks that need to be allocated on the storage blocks for all SG elems in sorted transaction-dependent SG array 716 (Num FBs, PBs to be allocated 718).

As shown in FIG. 6B, method 600 proceeds from step 622 to step 624. At step 624, filesystem layer 210 generates logical transactions for all SG elems in the transaction-dependent SG array. Each logical transaction describes one or more write IOs to be performed on the storage device. For example, at step 626, filesystem layer 210 can invoke resource manager 211 to allocate blocks (file blocks, pointer blocks) and update VMFS metadata 234 using logical transactions. In contrast with method 500, in step 626 resource manager 211 is invoked only once for the entire transaction-dependent SG array. Resource manager 211 allocates blocks in aggregate based on number file blocks, pointer blocks to be allocated 718.

At step 628, filesystem layer 210 commits the logical transactions. In particular, at step 630, filesystem layer 210 batches multiple logical transactions into a physical transaction targeting the file on the storage device. At step 632, filesystem layer 210 identifies file blocks to be zeroed, sorts the corresponding file block addresses, and issues a synchronous write to the storage device to zero out the identified file blocks. File blocks to be zeroed are those that are newly allocated, as well as any previously allocated file blocks having the TBZ field set in its file block address.

At step 634, filesystem layer 210 issues separate asynchronous writes of the transaction-independent SG array and the transaction-dependent SG array. Thus, the data for both SG arrays are written to the file in parallel. Further, the data for both SG arrays are written to the file in parallel with commitment of the physical transaction. At step 636, filesystem layer 210 executes the physical transaction on the storage device. In particular, at step 638, filesystem layer 210 commits the VMFS metadata updates to the journal and writes the metadata to the file on the storage device.

At step 640, filesystem layer 210 waits for all operations to complete. At step 642, filesystem layer 210 determines if any operations had failures. Note that filesystem layer 210 can detect failures at any time during the operations. If there is a failure, method 600 proceeds to step 644, where filesystem layer 210 returns a failure for the write IO operation. If there are no failures, method 600 proceeds to step 646, where filesystem layer 210 returns success for the write IO operation.

Method 600 exhibits several performance improvements over method 500. First, method 600 performs sorting of the SG array based on the file offset of the SG elems (step 606) VMFS uses a fixed block size for file blocks. With a fixed block size, filesystem layer 210 can determine if the resolved file offset for two SG elems targets the same file block without actually resolving these offsets. Filesystem layer 210 uses this property with the sorted SG array to determine disjoint sets of SG elems that target the same file block. For each of the disjoint sets of SG elems, filesystem layer 210 needs to resolve the file offset only once.

Method 600 separates the operations of 1) file offset resolution for the entire SG array and 2) block allocation for SG elem that require same. This is done by performing file offset resolution for the entire SG array without allocating any file blocks or pointer blocks as shown in FIG. 6A. After file offset resolution for the entire SG array, filesystem layer 210 knows which SG elems need transactions (for file block allocation, pointer block allocation, metadata updates) and which do not. Filesystem layer 210 can then split the SG array into two separate SG arrays, one with transaction-dependent SG elems and one with transaction-independent SC elems.

Further, due to the separation of file offset and block allocation operations noted above, filesystem layer 210 knows the total number of file blocks and pointer blocks that are to be allocated for the entire SG array. Filesystem layer 210 invokes resource manager 211 for a batch allocation of that number of file blocks and pointer blocks using VMFS logical transactions. This saves IO cost and CPU cycles as compared to method 500, where the resource manager is invoked potentially per SG elem.

For a write IO operation that requires new block allocation, the following types of write IOs are involved.
A) A write IO to zero out all newly allocated file blocks for the SG array.
B) A write IO to persist the VMFS metadata updates to the on-disk journal by committing a VMFS physical transaction.
C) A write IO to write the file data pointed to by the SG array. This write IO is further split into two write IOs:
C.1) one for the transaction-independent array and
C.2) another for the transaction-dependent array.

Method 600 performs a synchronous write IO to zero out all newly allocated file blocks before issuing write IOs in B) and C) above. The write IO sequence followed is A->{B, C1, C2}, where ->indicates the "happens before" relationship and IOs inside { } can be issued in parallel. If write IO B) fails, the entire write IO operation can be failed irrespective of the status of write IO C1) and write IO C2). This allows compliance with Requirement B described above, as file metadata points to NULL file block addresses for newly to be allocated file blocks and hence any forthcoming read IOs to this portion of the file returns all zero bytes. If any of the write IOs in operations C.1 and C.2 fail, and if the write IO in operation B succeeds, filesystem layer 210 fails the entire write IO operation. However, with successful transaction commit (write IO B), file metadata points to the newly allocated file block. However, write IO A ensures that the newly allocated file block has been zeroed on the storage device. Hence, any forthcoming read IO to the newly allocated file block will return all zero bytes if it falls outside of the earlier failed write IO portion of a newly allocated file block. This satisfies requirement B described above.

Figure 8:
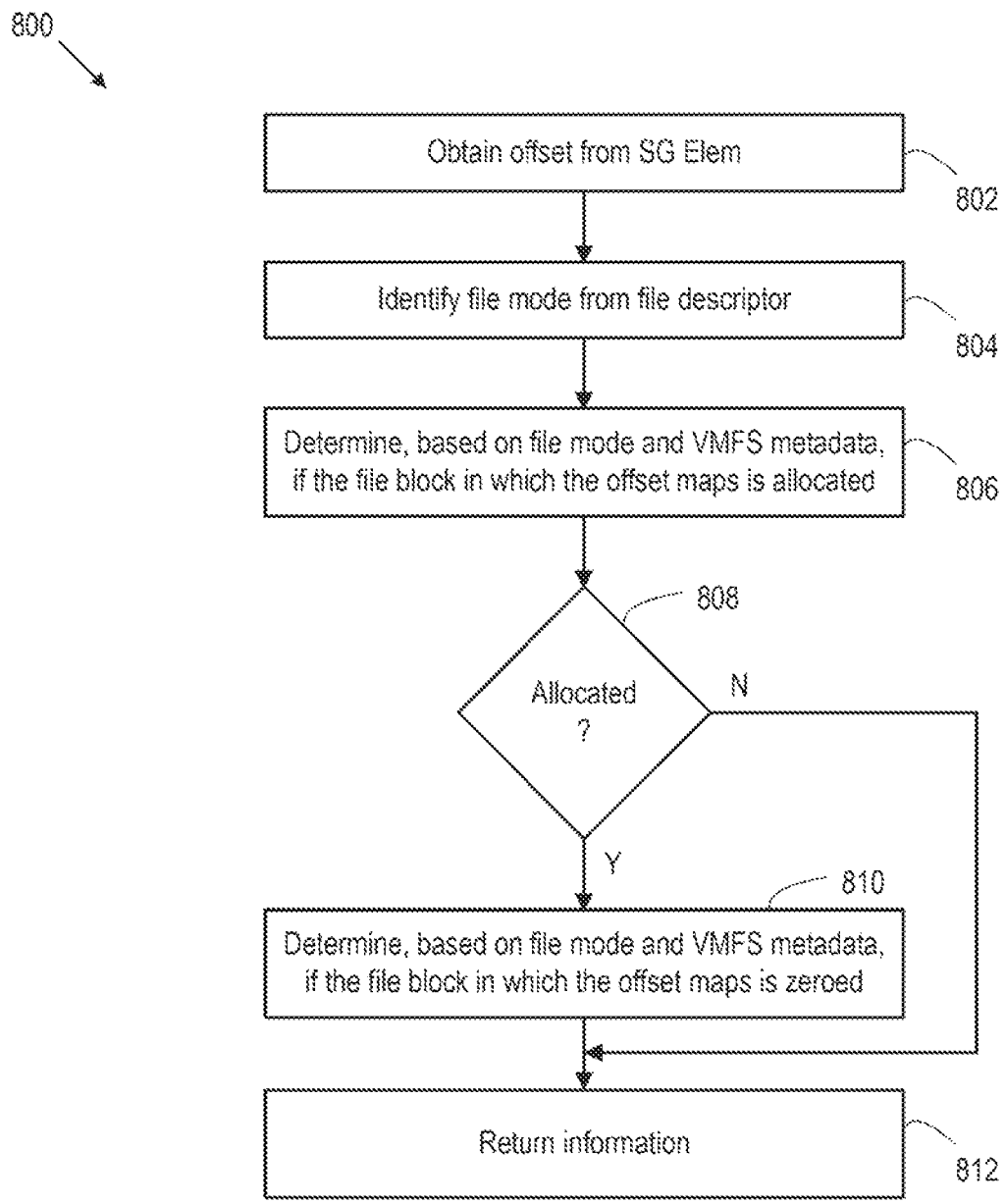
FIG. 8 is a flow diagram depicting a method of resolving a file offset according to an embodiment.

FIG. 8 is a flow diagram depicting a method 800 of resolving file offset according to an embodiment. Method 800 can be used at step 610 in the method 600 described above. Method 800 begins at step 802, where filesystem layer 210 obtains an offset from an SG elem. At step 804, filesystem layer 210 identifies a file mode from the file descriptor in the VMFS metadata (e.g., mode 403). At step 806, filesystem layer 210 determines, based on the file mode and the VMFS metadata, if the file block in which the offset maps is allocated. If at step 808 the file block is not allocated, method 800 proceeds to step 812. If the file block is allocated, filesystem layer 210 must then determine if the file block has been zeroed. Thus in that case method 800 proceeds from step 808 to step 810. At step 810, filesystem layer 210 determines, based on file mode and VMFS metadata, if the file block in which the offset maps is zeroed. At step 812, the information is returned (e.g., file block address, whether the file block has been allocated, whether the file block has been zeroed).

Based on file mode, the algorithm operates as follows. For file mode "small data:" If the write IO offset falls beyond the current end of the file, the file block and pointer block(s) need to be allocated to the file. The to be allocated file block needs to be zeroed as well.

For file mode "direct address:" if the write IO offset falls beyond the current end of the file, the file block and pointer block(s) need to be allocated to the file. The to be allocated file block needs to be zeroed as well. If the IO offset falls within the current end of the file, compute the file block number from the IO offset. Check the value of the file block number address noted inside the file descriptor address information field. If the value is NULL, the current write IO requires a file block to be allocated. To be allocated file block needs to be zeroed as well. If the value is not NULL, the current IO does not require a file block to be allocated. Check the TBZ field inside the file block address to determine if the already allocated file block needs to be zeroed out on the storage device.

For file mode "single indirect:" If the write IO offset falls beyond the current end of the file, the file block and pointer block(s) need to be allocated to the file. The to be allocated file block needs to be zeroed as well. If the IO offset falls within the current end of the file, compute the single indirect pointer block number from the IO offset. Check the value of the single indirect pointer block number noted inside the file descriptor address information field. If the value is NULL, the current write IO requires a file block and pointer block to be allocated. To be allocated tile block needs to be zeroed as well. If the value is not NULL, compute the file block number from the IO offset inside the single indirect pointer block. Check the value of the file block number address noted inside the single indirect pointer block. If that value is NULL, the current write IO requires a file block to be allocated. The to be allocated file block needs to be zeroed as well. If that value is not NULL, the current IO does not require a file block to be allocated. Check the TBZ field inside the file block address to determine if the already allocated file block needs to be zeroed on the storage device.

For file mode "double indirect:" If the write IO offset falls beyond the current end of the file, file block, pointer block(s) need to be allocated to a file. To be allocated file block needs to be zeroed out as well. If the IO offset falls within the current end of the file, compute the Double indirect Pointer block number from the IO offset. Check the value of Double indirect Pointer block number address noted inside the file descriptor address information field. If the value is NULL, the current write IO requires a file block, pointer block(s) to be allocated. To be allocated file block needs to be zeroed out as well. If the value is not NULL, compute the single indirect pointer block number from the IO offset inside the double indirect pointer block. Check the value of single indirect pointer block number address noted inside the double indirect pointer block. If that value is NULL, the current write IO requires a file block, pointer block to be allocated. To be allocated file block needs to be zeroed out as well. If that value is not NULL, compute the file block number from the IO offset inside the single indirect pointer block. Check the value of file block number address noted inside the single indirect pointer block. If that value is NULL, the current write IO requires a file block to be allocated. To be allocated file block needs to be zeroed out as well. If that value is not NULL, current IO doesn't require a file block to be allocated. Check the TBZ field inside the file block address to determine if the already allocated file block needs to be zeroed out on the storage device.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of handling, at a hypervisor on a host in a virtualized computing system, a write input/output (IO) operation to a file on a storage device having a virtual machine file system (VMFS), the method comprising:
   sorting, at the hypervisor, a scatter-gather array for the write IO operation into sets of scatter-gather elements, each of the sets including at least one scatter-gather element targeting a common file block address;

resolving offsets of the sets of scatter-gather elements to identify a first scatter-gather array of transaction-dependent scatter-gather elements;
generating logical transactions for the first scatter-gather array having updates to metadata of the VMFS for the file;
batching the logical transactions into a physical transaction; and
executing the physical transaction to commit the updates to the metadata of the VMFS on the storage device for the file.

2. The method of claim 1, further comprising:
prior to executing the physical transaction, identifying file blocks of the VMFS for the file to be zeroed based on the resolved offsets of the sets of scatter-gather elements; and
executing a synchronous write to the storage device to zero the identified file blocks.

3. The method of claim 2, further comprising:
resolving the offsets of the sets of scatter-gather elements to identify a second scatter-gather array of transaction-independent scatter-gather elements; and
executing, concurrently with the physical transaction, a first asynchronous write to persist data identified by the first scatter-gather array to the storage device for the file, and a second asynchronous write to persist data identified by the second scatter-gather array to the storage device for the file.

4. The method of claim 1, wherein the step of executing the physical transactions comprises:
committing the updates to the metadata to a journal of the VMFS.

5. The method of claim 1, wherein the step of generating the logical transactions comprises:
identifying, based on the resolved offsets of the sets of scatter-gather elements, a number of blocks to be allocated on the VMFS for the file; and
invoking a resource manager of the hypervisor to allocate the number of blocks in aggregate.

6. The method of claim 1, wherein the step of resolving the offsets comprises:
obtaining an offset from a scatter-gather element for a first set of scatter-gather elements;
identifying a file mode from a file descriptor for the file; and
determining, based on the file mode and the metadata of the VMFS for the file, whether a file block to which the offset maps is allocated.

7. The method of claim 6, further comprising:
responsive to the file block to which the offset maps being allocated, determining, based on the file mode and the metadata of the VMFS for the file, whether the file block is zeroed.

8. A non-transitory computer readable medium comprising instructions to be executed in a computing device to cause the computing device to carry out a method of handling, at a hypervisor on a host in a virtualized computing system, a write input/output (IO) operation to a file on a storage device having a virtual machine file system (VMFS), the method comprising:
sorting, at the hypervisor, a scatter-gather array for the write IO operation into sets of scatter-gather elements, each of the sets including at least one scatter-gather element targeting a common file block address;
resolving offsets of the sets of scatter-gather elements to identify a first scatter-gather array of transaction-dependent scatter-gather elements;
generating logical transactions for the first scatter-gather array having updates to metadata of the VMFS for the file;
batching the logical transactions into a physical transaction; and
executing the physical transaction to commit the updates to the metadata of the VMFS on the storage device for the file.

9. The non-transitory computer readable medium of claim 8, further comprising:
prior to executing the physical transaction, identifying file blocks of the VMFS for the file to be zeroed based on the resolved offsets of the sets of scatter-gather elements; and
executing a synchronous write to the storage device to zero the identified file blocks.

10. The non-transitory computer readable medium of claim 9, further comprising:
resolving the offsets of the sets of scatter-gather elements to identify a second scatter-gather array of transaction-independent scatter-gather elements; and
executing, concurrently with the physical transaction, a first asynchronous write to persist data identified by the first scatter-gather array to the storage device for the file, and a second asynchronous write to persist data identified by the second scatter-gather array to the storage device for the file.

11. The non-transitory computer readable medium of claim 8, wherein the step of executing the physical transactions comprises:
committing the updates to the metadata to a journal of the VMFS.

12. The non-transitory computer readable medium of claim 8, wherein the step of generating the logical transactions comprises:
identifying, based on the resolved offsets of the sets of scatter-gather elements, a number of blocks to be allocated on the VMFS for the file; and
invoking a resource manager of the hypervisor to allocate the number of blocks in aggregate.

13. The non-transitory computer readable medium of claim 8, wherein the step of resolving the offsets comprises:
obtaining an offset from a scatter-gather element for a first set of scatter-gather elements;
identifying a file mode from a file descriptor for the file; and
determining, based on the file mode and the metadata of the VMFS for the file, whether a file block to which the offset maps is allocated.

14. The non-transitory computer readable medium of claim 13, further comprising:
responsive to the file block to which the offset maps being allocated, determining, based on the file mode and the metadata of the VMFS for the file, whether the file block is zeroed.

15. A host computer, comprising:
a processor and a memory; and
a hypervisor executing on the processor and the memory, the hypervisor configured to handling a write input/output (IO) operation to a file on a storage device having a virtual machine file system (VMFS) by:
sorting, at the hypervisor, a scatter-gather array for the write IO operation into sets of scatter-gather elements, each of the sets including at least one scatter-gather element targeting a common file block address;

resolving offsets of the sets of scatter-gather elements to identify a first scatter-gather array of transaction-dependent scatter-gather elements;

generating logical transactions for the first scatter-gather array having updates to metadata of the VMFS for the file;

batching the logical transactions into a physical transaction; and executing the physical transaction to commit the updates to the metadata of the VMFS on the storage device for the file.

16. The host computer of claim 15, wherein the hypervisor is configured to:

prior to executing the physical transaction, identify file blocks of the VMFS for the file to be zeroed based on the resolved offsets of the sets of scatter-gather elements; and execute a synchronous write to the storage device to zero the identified file blocks.

17. The host computer of claim 16, wherein the hypervisor is configured to:

resolve the offsets of the sets of scatter-gather elements to identify a second scatter-gather array of transaction-independent scatter-gather elements; and execute, concurrently with the physical transaction, a first asynchronous write to persist data identified by the first scatter-gather array to the storage device for the file, and a second asynchronous write to persist data identified by the second scatter-gather array to the storage device for the file.

18. The host computer of claim 15, wherein the hypervisor executes the physical transactions by:

committing the updates to the metadata to a journal of the VMFS.

19. The host computer of claim 15, wherein the hypervisor generates the logical transactions by:

identifying, based on the resolved offsets of the sets of scatter-gather elements, a number of blocks to be allocated on the VMFS for the file; and invoking a resource manager of the hypervisor to allocate the number of blocks in aggregate.

20. The host computer of claim 15, wherein the hypervisor resolves the offsets by:

obtaining an offset from a scatter-gather element for a first set of scatter-gather elements;

identifying a file mode from a file descriptor for the file; and determining, based on the file mode and the metadata of the VMFS for the file, whether a file block to which the offset maps is allocated.

* * * * *